US006234013B1

(12) United States Patent
Galloway

(10) Patent No.: US 6,234,013 B1
(45) Date of Patent: May 22, 2001

(54) SOLAR-PLASMA METER

(76) Inventor: Bobby A. Galloway, 5511 Moat Dr., Orlando, FL (US) 32810

( * ) Notice: Subject to any disclaimer, the term of this patent is extended or adjusted under 35 U.S.C. 154(b) by 0 days.

(21) Appl. No.: 09/432,681

(22) Filed: Nov. 2, 1999

(51) Int. Cl.[7] .......... G01W 1/00
(52) U.S. Cl. .......... 73/170.27
(58) Field of Search .......... 73/170.01, 170.06, 73/170.12, 170.25, 170.27, 170.16, 862.381

(56) References Cited

U.S. PATENT DOCUMENTS

| | | | | |
|---|---|---|---|---|
| 1,068,169 | | 7/1913 | Ricketts . | |
| 1,336,925 | | 4/1920 | Sakauye . | |
| 2,017,224 | | 10/1935 | Wilhelm . | |
| 3,676,672 | * | 7/1972 | Meckel et al. | 250/427 |
| 4,095,118 | * | 6/1978 | Rathbun | 290/2 |
| 4,507,611 | | 3/1985 | Helms . | |
| 4,920,313 | | 4/1990 | Constant . | |
| 5,234,183 | * | 8/1993 | Hammer | 244/158 R |

FOREIGN PATENT DOCUMENTS

| | | |
|---|---|---|
| 1472487 | 3/1966 | (FR) . |
| 230741 | 3/1969 | (SU) . |

* cited by examiner

*Primary Examiner*—Max Noori
(74) *Attorney, Agent, or Firm*—Edward M. Livingston, Esq

(57) ABSTRACT

A solar-plasma meter has a plasma compass (1) and a plasma scale (8, 9) in a meter housing (6, 10) having atmospherically controlled enclosure that is permeable to solar plasma. The plasma compass has a plasma sail (2) having direction-responsive surface and force-responsive surface attached to a force-measurement member (3) suspended from a universally rotational housing mount (7) that is vertically above a force-indication point (4). The plasma scale has a plasma plate (13, 14) oriented horizontally and suspended vertically for measuring solar plasmatic mass encountering the plasma plate. The solar plasma meter can be selectively portable or stationary with concentric or separate construction of the plasma compass and the plasma scale.

22 Claims, 4 Drawing Sheets

SOLAR-PLASMA METER

BACKGROUND OF THE INVENTION

This invention relates to detection and measurement of density, direction of flow and force of solar plasma at a select position on the earth.

Although it is known that physical relationships between the earth and the sun are affected directly by rate and density of solar plasma emitted by the sun and striking the earth, there has been no convenient and inexpensive tool for their widespread and systematic measurement. Previously, advancements in analyzing plasmatic emissions from the sun have been limited mostly to scientific laboratories. Those known have been too slow and too expensive for practical use in relation to weather projection, gravitational analysis, atmospheric analysis and stratospheric analysis of the earth.

There are known systems for measuring earth winds, ocean currents and earth gravitation, but none for detecting and measuring direction, density and force of solar plasmatic winds on the earth in a manner taught by this invention.

Examples of the most closely related but different known measuring systems are described in the following patent documents. U.S. Pat. No. 4,920,313, issued to Constant on Apr. 24, 1990, described a gravitational mass detector for comparing artificial gravity to known natural gravity for analytical comparisons and deductions. U.S. Pat. No. 4,507,611, issued to Helms on Mar. 26, 1985, described a method for locating and evaluating surface and subsurface anomalies by measurement of current emitted from the earth. Effects of solar activity, but not solar plasma, also were included. A selection of earth wind and ocean current meters are known.

Relative to travel of solar plasma, the earth can be likened to a ball in a wind tunnel. On a downwind side, there is vacuum-induced drag. Around the edge, there is a venturi effect with high density and high velocity. At 400 Km per second, solar plasma travels straight at approximately 0.0013 (1/751) of the speed of light but faster from the venturi effect at the poles where it is often visible as colored lights. Similarly, a fluid warps at venturi-induced speeds to bypass large objects like the earth, according to Einstein. On a face of the ball Earth, solar plasma changes directions constantly, not only in response to directional positioning from the sun, but also from direction of plasma-emitting positions on the sun. It is from all directions at any and all times that the Solar Plasma Meter meters solar plasma selectively for comprehensive analysis of solar effects on the earth.

SUMMARY OF THE INVENTION

Objects of patentable novelty and utility taught by this invention include providing a solar-plasma meter which can be used to measure density, force and direction of solar plasma, such measurements being usable to predict many natural occurances, including the timing and level of tides.

This invention accomplishes these and other objectives with a plasma compass and a plasma scale in an atmospherically controlled enclosure that is permeable to solar plasma. The plasma compass has a plasma sail with direction-responsive surface and force-responsive surface attached to a force rod or needle suspended from a universally rotational mount that is vertically above a force-measurement point. The plasma scale has a plasma plate oriented horizontally and suspended vertically for measuring solar plasmatic mass of solar plasma encountering the plasma plate in excess of weight of the plasma plate and its related support. The plasma compass and the plasma scale can have unified or separate construction.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are explained brief as follows:

DESCRIPTION OF PREFERRED EMBODIMENT

Listed numerically below with reference to the drawings are terms used to describe features of this invention. These terms and list numbers assigned to them designate the same features throughout this description.

| | |
|---|---|
| 1. Plasma compass | 15. Support. lines |
| 2. Plasma sail | 16. Portable plasma sail |
| 3. Force-measurement member | 17. Plasma cross plate |
| 4. Force-indication point | 18. Stationary-unit pointer |
| 5. Measurement ring | 19. Stationary degree marker |
| 6. Stationary meter housing | 20. Portable degree marker |
| 7. Housing mount | 21. Portable-unit pointer |
| 8. Placement scale | 22. Fact-and-time recorder |
| 9. Hang scale | 23. Clock |
| 10. Portable meter housing | 24. Force-measurement ring |
| 11. Lateral support | 25. Portable measurement ring |
| 12. Vertical support | 26. Lighting member |
| 13. Stationary plasma plate | 27. Balance hang scale |
| 14. Portable plasma plate | 28. Balance weight |

Figure 1:
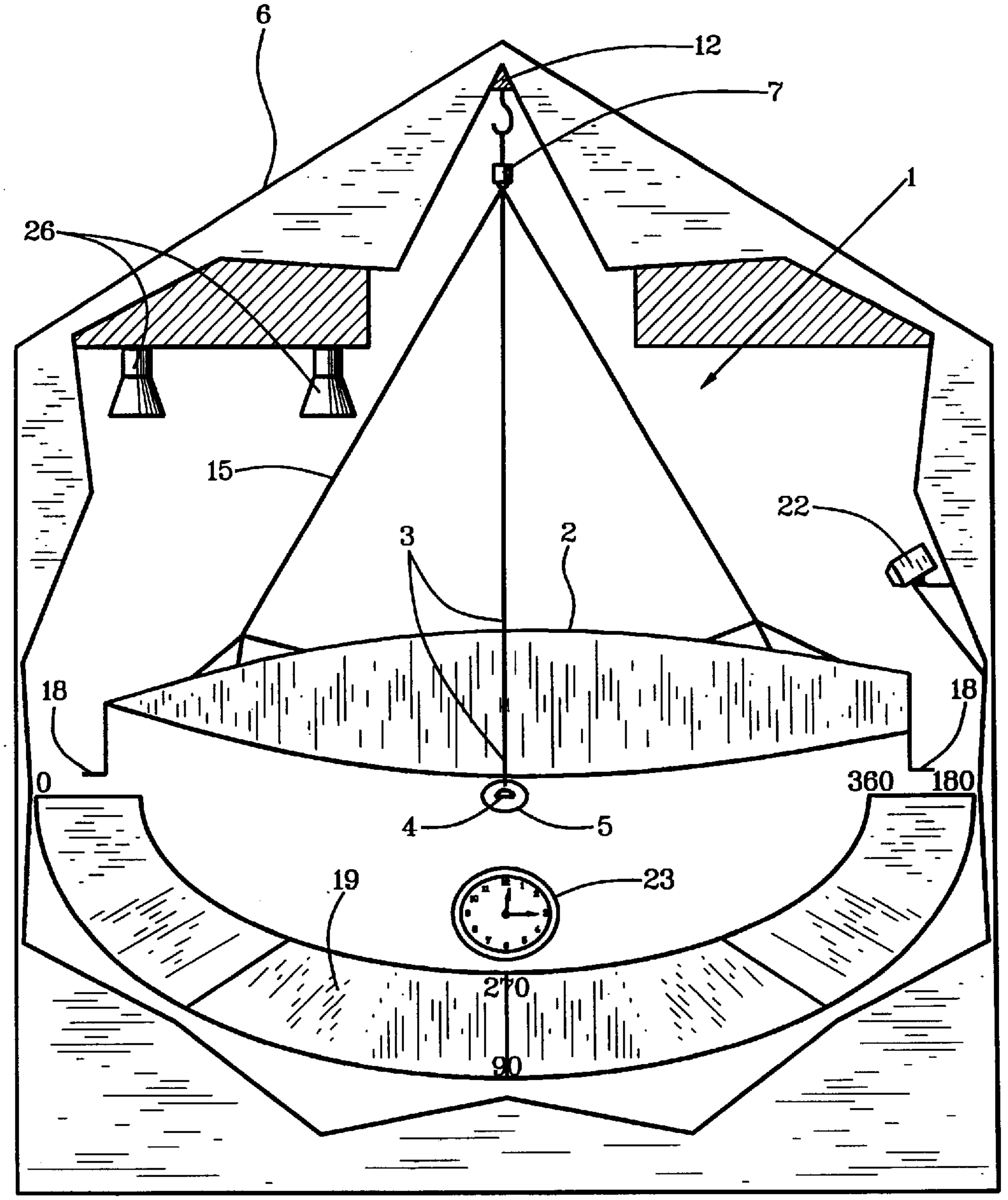
FIG. 1 is a partially cutaway perspective view of a compass portion of a stationary solar-plasma meter.
Figure 2:
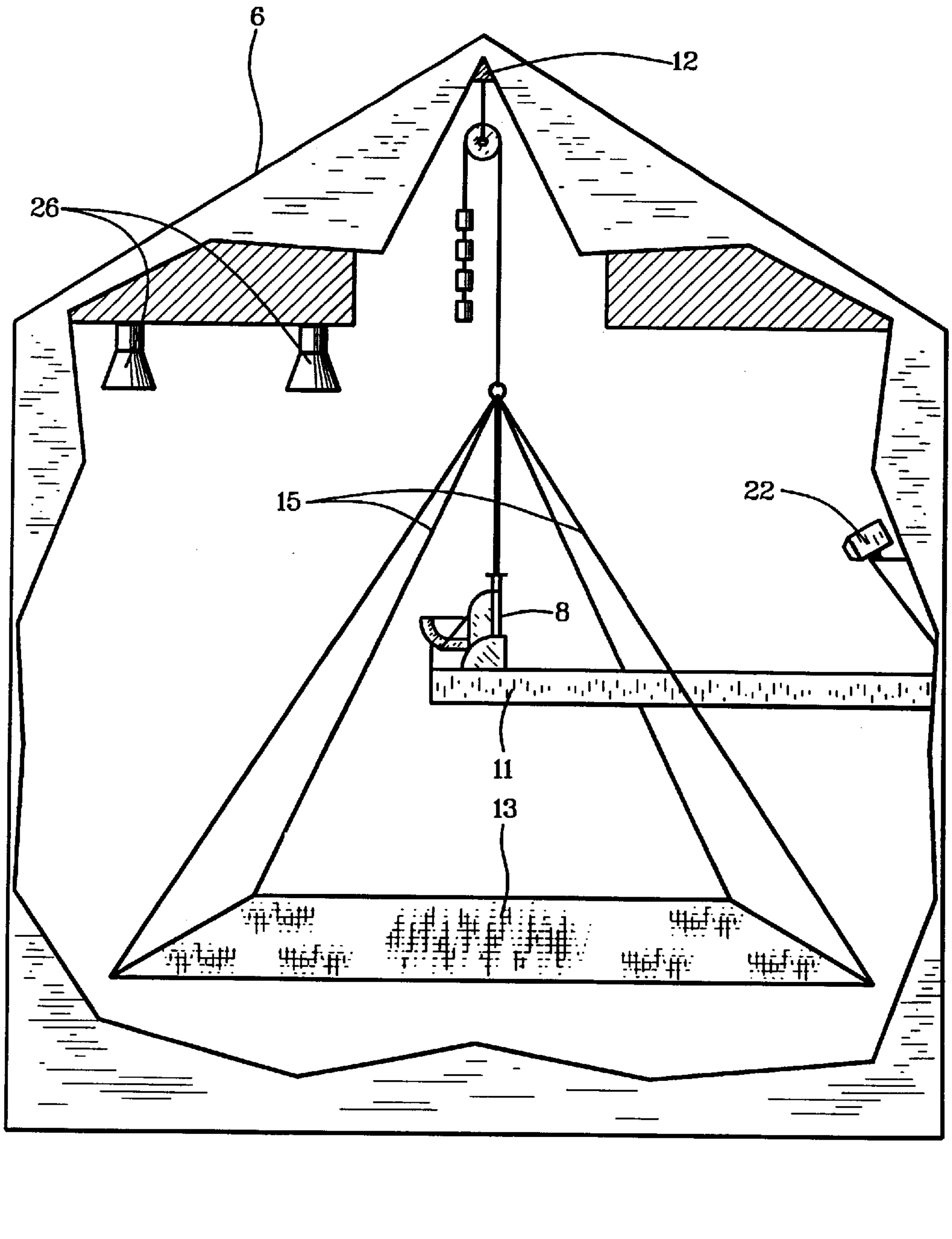
FIG. 2 is a partially cutaway perspective view of a scale portion of the A. stationary solar-plasma meter.

Reference is made first to FIGS. 1–2. A solar-plasma meter has a plasma compass 1 with a plasma sail 2 having direction-indication surface and force-indication surface oriented uprightly. The plasma sail 2 is positioned on a force-measurement member 3 having centralizing force such as gravity to force the force-measurement member 3 towards a force-indication point 4 that is centrally within a force-measurement indicator such as at least one measurement ring 5.

The force-measurement member 3 is preferably an upright suspender having a top end attached rotatably to an apex or roof portion of a stationary meter housing 6 with a housing mount 7 that is rotational horizontally and pivotal vertically for a universally rotational attachment. A centralizer is preferably a combined suspended mass of the force-measurement member 3, the plasma sail 2 and other suspended mass such as mass of attachment items and optionally additional suspended mass attached to the force-measurement member 3. Gravitational force is employed on the combined suspended mass for centering the force-measurement member 3 vertically above the force-indication point 4 in opposition to off-centering pressure of solar plasma on the plasma sail 2. Optionally, the centralizer can be circumferentially centering pressure of springs, gas, magnetism or other pressure inducers.

Figure 3:
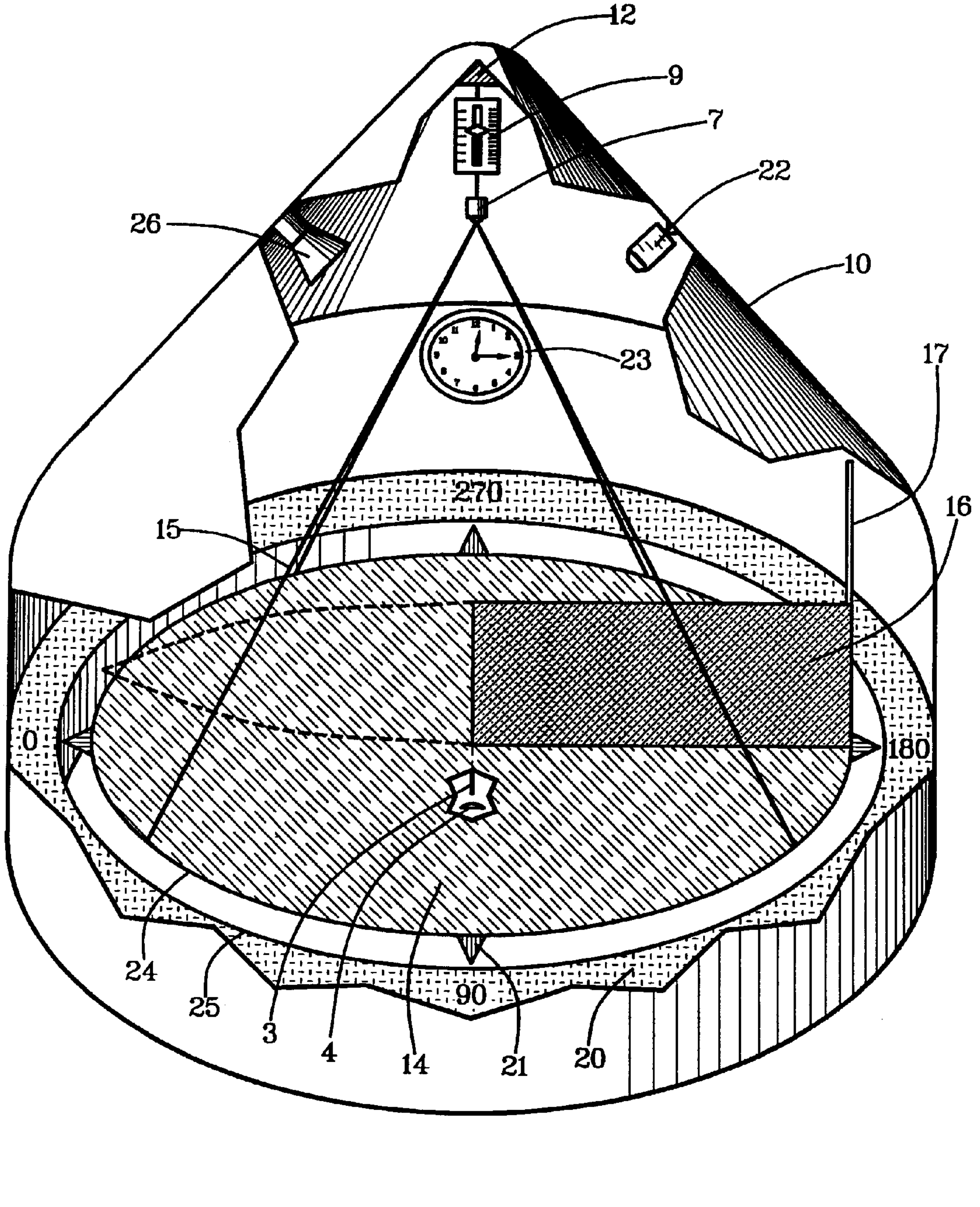
FIG. 3 is a partially cutaway perspective view of a portable solar-plasma meter.
Figure 4:
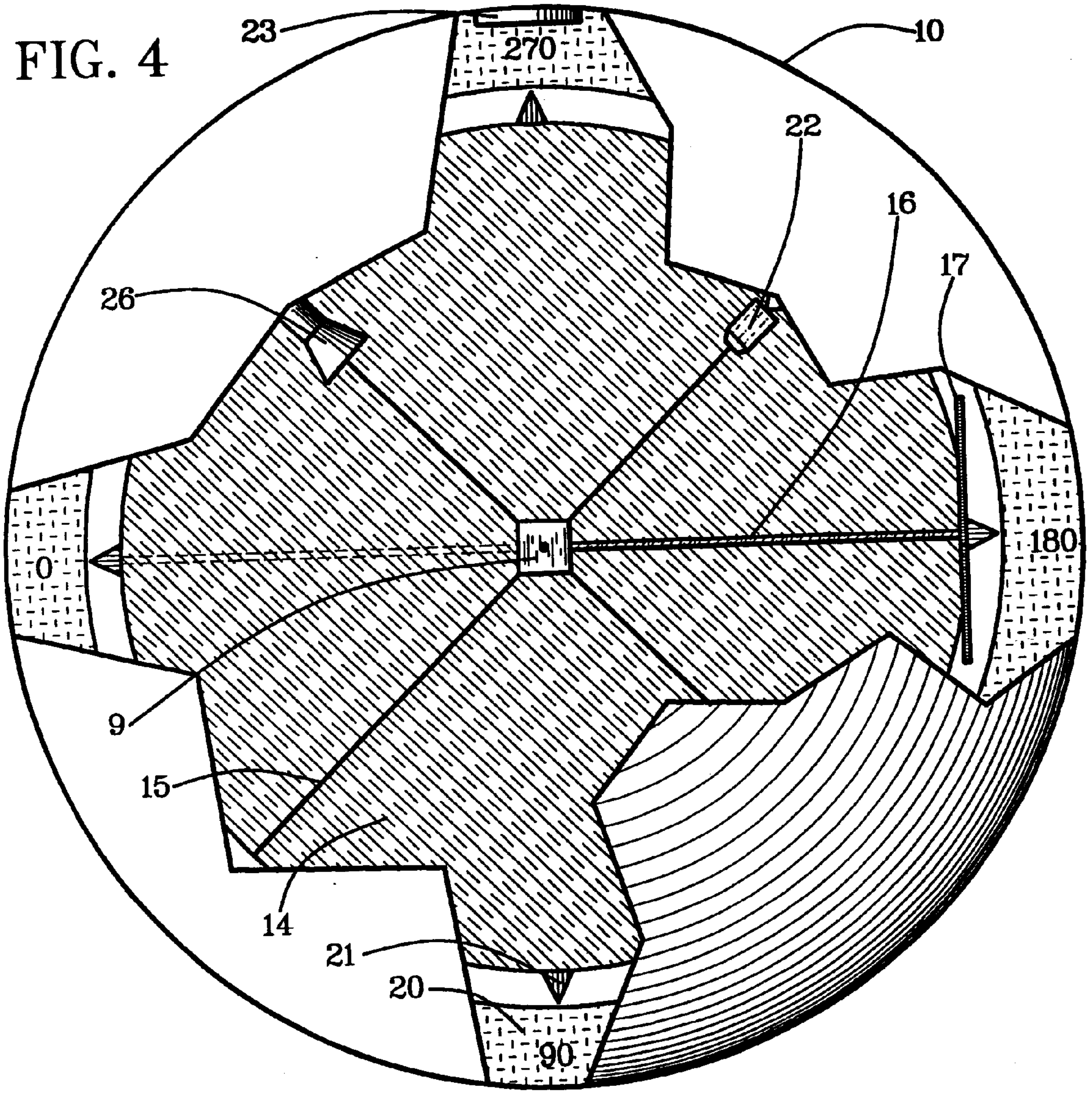
FIG. 4 is a partially cutaway top view of the FIG. 3 illustration.

Referring to FIGS. 1–4, a plasma scale, such as a placement scale 8 shown in FIG. 2 or a hang scale 9 shown in FIGS. 3–4, having predetermined accuracy and weight sensitivity is positioned in predetermined proximity to the plasma compass 1 in the stationary meter housing 6 depicted in FIGS. 1–2 or in an optional portable meter housing 10 depicted in FIGS. 3–4. The placement scale 8 can be supported by a lateral support 11 depicted in FIG. 2 and the hang scale 9 can be supported by a vertical support 12 depicted in FIGS. 1–3. Accuracy of weighing plasma density with the placement scale 8 can be enhanced by weight balances over a pulley wheel as depicted in FIG. 2 to minimize weight differences for some types of scales.

A plasma plate, such as a stationary plasma plate 13 shown in FIG. 2 or optionally a portable plasma plate 14 shown in FIGS. 3–4 and having predetermined size, shape and structure to be encountered by solar plasma, is oriented horizontally and attached to the placement scale 8 or the hang scale 9 respectively as shown. Support lines 15, preferably made of a stainless and impervious material such as a suitable stainless steel, support the stationary plasma plate 13, the portable plasma plate 14, the plasma sail 2 and the portable plasma sail 16 respectively as shown in FIGS. 1–4.

The stationary meter housing 6 can be a building with shelter from atmospheric conditions in predetermined proportion to permeability to solar plasma for particular sizes and levels of friction of support for plasma sails 2 and stationary plasma plates 13. A frame building approximately the size of a two-car garage with asphalt shingles and standard drywall paneling was used with the approximate size relationships for the embodiment depicted in FIGS. 1–2. With housing structure for adequate atmospheric conditioning and plasmatic permeability, a portable meter housing 10 that is preferably round with a conical and/or domed plastic material can be as small as one meter or half of a meter in diameter for a portable plasma sail 16, a plasma cross plate 17 and the portable plasma plate 14 positioned concentrically as shown in FIGS. 3–4 and having sufficiently accurate construction.

Solar plasma affects both organic and inorganic matter on the earth because it has a fluctuant density of several-to-several-thousand universe-structure plasmatic atoms per cubic meter. Measurement of its density is vital. The plasma scale is a fundamental part of this tool for metering the nature and activity of solar plasma.

At least one degree pointer such as a stationary-unit pointer 18 on the plasma sail 2 can be used to indicate plasma-flow direction on a directional-degree marker such as a stationary degree marker 19 shown in FIG. 1. As shown in FIGS. 3–4, a portable degree marker 20 having at least one portable-unit pointer 21 at an outside edge of the portable plasma plate 14 can be used for indicating plasma-flow direction.

A fact-and-time recorder 22 such as a video and/or electronic recorder is positioned to record time on a clock 23 in its observable range and to record (a) rotational travel of the plasma sail 2 or the portable plasma sail 16 in response to direction of flow of solar plasma, (b) distancing of the force-measurement member 3 from the force-indication point 4 in response to force of flow of solar plasma, and (c) weight on the placement plasma scale 8 or on the hang scale 9 in response to density of the solar plasma.

For a solar-plasma meter with concentric construction of the portable plasma sail 16, the portable plasma plate 14 and the hang scale 9 in line as shown in FIGS. 3–4, the force-measurement member 3 can be either extended from a bottom of the portable plasma plate 14, supplemented by or substituted by a force-measurement ring 24 positioned proximate an outside edge of the portable plasma plate 14. Correspondingly, the measurement ring 5 can be substituted or supplemented by a portable measurement ring 25 on the portable degree marker 20 to indicate variation of plasma force by variation of distance between the force-measurement ring 24 and the portable measurement ring 25 at force-induced degrees of directional flow of solar plasma.

The portable plasma sail 16 can be off-center structured on a tail-end side as shown in solid lines or double-ended as shown in dashed lines. The plasma cross plate 17 preferably is positioned vertically above the tail end of the portable plasma sail 16 in order to be actuated by solar plasmatic force while avoiding obstruction of vane-directing action of the solar plasma.

Lighting members 26 are provided as appropriate for visual recording of facts and time with the fact-and-time recorder 22. However, the fact-and-time recorder 22 is intended for optionally visual or electronic measurement.

Although the embodiment shown and described in relation to FIGS. 3–4 is referred to for portability, it is intended for both portable and large stationary sizes and applications.

Figure 5:
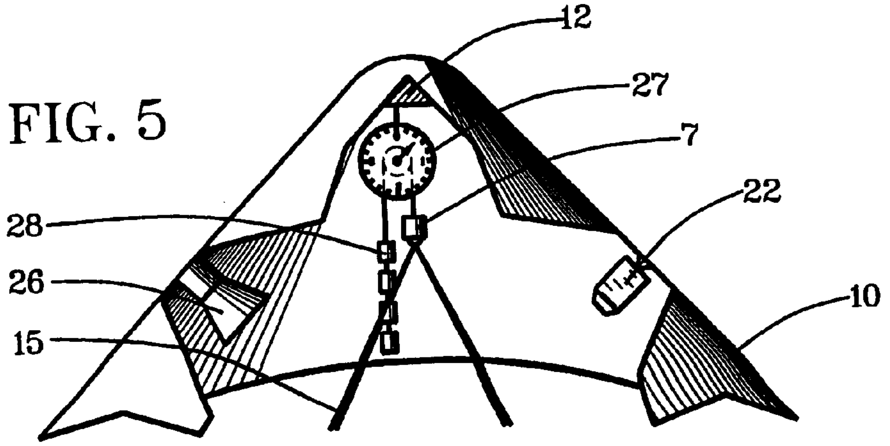
FIG. 5 is a partially cutaway side view of a top section of the FIG. 3 illustration with a balance hang scale.

The hang scale 9 can be either a spring type as depicted in FIGS. 3–4 or a balance scale 27 with balance weights 28 as depicted in FIGS. 2 and 5.

A new and useful solar-plasma meter having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A solar-plasma meter comprising:

a plasma compass having a plasma sail with direction-indication surface and force-indication surface suspended uprightly from a meter housing;

a force-measurement member on the plasma sail;

a force-measurement indicator positioned circumferentially external from a force-indication point on the solar-plasma meter;

a centralizer having centralizing force of the force-measurement member towards the force-indication point;

a plasma scale positioned in predetermined proximity to the plasma compass;

a plasma plate having predetermined size, shape and structure to be encountered by solar plasma;

the plasma plate being oriented horizontally and attached to the plasma scale for measurement of weight of the solar plasma;

the meter housing having a meter enclosure in which the plasma compass and the plasma scale are positioned;

the meter enclosure having predetermined atmospheric control and predetermined permeability to solar plasma;

at least one degree pointer proximate the plasma sail;

a directional-degree marker proximate the degree pointer;

a fact-and-time recorder of (a) rotational travel of the plasma sail in response to direction of flow of solar plasma, (b) distancing of the force-measurement member from the force-indication point in response to force of flow of solar plasma, and (c) weight on the plasma scale in response to density of the solar plasma; and a clock in observable range of the fact-and-time recorder.

2. A solar-plasma meter as described in claim 1 wherein:

the plasma sail is a thin, flat member having a front end that is pointed and a tail end with predetermined broadness vertically;

the tail end being direction-indication surface and predetermined portions point-ward of the tail end being force-indication surface;

the force-measurement member is an upright suspender having a top end attached with a housing mount having universally rotational attachment to the meter housing;

the upright suspender having a bottom end with a force-measurement point positioned proximate a bottom center of the plasma sail;

the force-measurement indicator is a marker point positioned on a base surface of the meter housing directly under the force-measurement member in a vertically suspended orientation and position of the force-measurement member;

at least one marker ring is positioned at a predetermined distance from and concentrically surrounding the force-measurement indicator; and a plurality of circumferential degree marks are positioned arcuately on a base surface proximate a path of circular travel of at least one end of the plasma sail.

3. A solar-plasma meter as described in claim 1 wherein:

the meter housing has a roof under which a top end of the force-measurement member is suspended with universal rotation;

the centralizer is suspended mass which includes suspended mass of the force-measurement member and the solar sail on which gravitational force is employed; and the plasma scale is suspended from a scale position under the roof.

4. A solar-plasma meter as described in claim 1 wherein:

the meter housing is sized and shaped in proportion to the predetermined atmospheric control and to the predetermined permeability to the solar plasma of the meter enclosure.

5. A solar-plasma meter as described in claim 1 wherein:

the plasma compass and the plasma scale are positioned concentrically to the force-measurement member.

6. A solar-plasma meter as described in claim 5 wherein:

the force-measurement member is attached rotationally and pivotally to a vertical support on the enclosure; and the centralizer is a mass of items including and related to positioning of the force-measurement member, the plasma sail, the plasma scale and the plasma plate which are attached to the force-measurement member and acted upon vertically downward by force of gravity.

7. A solar-plasma meter as described in claim 6 wherein:

the plasma plate has an outside edge that is arcuate; and the force-measurement indicator is a force-measurement ring positioned proximate an outside edge of the plasma plate.

8. A solar-plasma meter as described in claim 7 wherein:

the force-indication surface on the plasma sail is a plasma cross plate having a frontal face that is orthogonal to the plasma sail and oriented vertically outside of a path of flow of solar plasma past sides of the plasma sail; and mass of the items attached to the force-measurement member is balanced centrally.

9. A solar-plasma meter comprising:

a plasma compass having a plasma sail with direction-indication surface and force-indication surface suspended uprightly from a meter housing;

a force-measurement member on the plasma sail;

a force-measurement indicator positioned circumferentially external from a force-indication point on the solar-plasma meter;

a centralizer having centralizing force of the force-measurement member towards the force-indication point;

the meter housing having a meter enclosure in which the plasma compass and the plasma scale are positioned;

the meter enclosure having predetermined atmospheric control and predetermined permeability to solar plasma;

at least one degree pointer proximate the plasma sail;

a directional-degree marker proximate the degree pointer;

a fact-and-time recorder of rotational travel of the plasma sail in response to direction of flow of solar plasma and distancing of the force-measurement member from the force-indication point in response to force of flow of solar plasma; and a clock in observable range of the fact-and-time recorder.

10. A solar-plasma meter as described in claim 9 wherein:

the plasma sail is a thin, flat member having a front end that is pointed and a tail end with predetermined broadness vertically;

the tail end being direction-indication surface and predetermined portions point-ward of the tail end being force-indication surface;

the force-measurement member is an upright suspender having a top end attached with a housing mount having universally rotational attachment to the meter housing;

the upright suspender having a bottom end with a force-measurement point positioned proximate a bottom center of the plasma sail;

the force-measurement indicator is a marker point positioned on a base surface of the meter housing directly under the force-measurement member in a vertically suspended orientation and position of the force-measurement member;

at least one marker ring is positioned at a predetermined distance from and concentrically surrounding the force-measurement indicator; and a plurality of circumferential degree marks are positioned arcuately on a base surface proximate a path of circular travel of at least one end of the plasma sail.

11. A solar-plasma meter as described in claim 9 wherein:

the meter housing has a roof under which a top end of the force-measurement member is suspended with universal rotation; and the centralizer is suspended mass which includes suspended mass of the force-measurement member and the solar sail on which gravitational force is employed.

12. A solar-plasma meter as described in claim 9 wherein:

the meter housing is sized and shaped in proportion to the predetermined atmospheric control and to the predetermined permeability to the solar plasma of the meter enclosure.

13. A solar-plasma meter as described in claim 9 wherein:

the force-measurement member is attached rotationally and pivotally to a vertical support on the enclosure; and the centralizer is a mass of items including and related to positioning of the force-measurement member and the plasma sail which are attached to the force-measurement member and acted upon vertically downward by force of gravity.

14. A solar-plasma meter as described in claim 9 wherein:

the force-indication surface on the plasma sail is a plasma cross plate having a frontal face that is orthogonal to the plasma sail and oriented vertically outside of a path of flow of solar plasma past sides of the plasma sail.

15. A solar-plasma meter comprising:

a plasma scale suspended from a top portion of an internal periphery of a meter housing having predetermined a meter enclosure with predetermined atmospheric control and predetermined permeability to solar plasma;

a plasma plate having predetermined size, shape and structure to be encountered by solar plasma;

the plasma plate being oriented horizontally and attached to a plasma scale for measurement of weight of the solar plasma;

a fact-and-time recorder of weight indicated on the plasma scale in response to density of the solar plasma; and a clock in observable range of the fact-and-time recorder.

16. A solar-plasma meter as described in claim 15 wherein:

the meter housing is sized and shaped in proportion to the predetermined atmospheric control and to the predetermined permeability to the solar plasma of the meter enclosure.

17. A solar-plasma meter as described in claim 15 wherein:

the plasma plate has an outside edge that is arcuate; and a force-measurement ring is positioned proximate an outside edge of the plasma plate.

18. A solar-plasma meter as described in claim 17 and further comprising:

a plasma cross plate positioned uprightly proximate the outside edge of the plasma plate.

19. A solar-plasma meter as described in claim 18 and further comprising:

a plasma sail oriented uprightly on the plasma plate.

20. A solar-plasma meter as described in claim 19 wherein:

the plasma sail is positioned outside of a path of flow of solar plasma towards a frontal face of the plasma cross plate.

21. A solar-plasma meter comprising:

a meter housing having an enclosure with predetermined atmospheric control and permeability to solar plasma;

a plasma scale attached to a top portion of an inside periphery of the meter housing;

a plasma sail having freely rotational attachment to the plasma scale for indicating directional flow of plasma;

a plasma plate attached to the plasma scale for weighing solar plasma;

a solar cross plate proximate the plasma sail and oriented orthogonally to the plasma sail; and a fact-and-time recorder of (a) rotational travel of the plasma sail in response to direction of flow of solar plasma, (b) lateral movement of the solar cross plate in response to force of flow of solar plasma, and (c) weight on the plasma scale in response to density of the solar plasma.

22. A solar-plasma meter as described in claim 21 and further comprising:

a clock in observable range of the fact-and-time recorder.

* * * * *